United States Patent [19]

Kato et al.

[11] 4,031,548
[45] June 21, 1977

[54] PLURAL RECEIVING AND RECORDING TELEVISION SYSTEM

[75] Inventors: Yoshiro Kato, Fujisawa; Choichi Fujita, Machida, both of Japan

[73] Assignee: Sony Corporation, Tokyo, Japan

[22] Filed: Sept. 25, 1975

[21] Appl. No.: 616,667

[30] Foreign Application Priority Data

Sept. 30, 1974 Japan .................. 49-112534

[52] U.S. Cl. .................. 358/188; 358/127
[51] Int. Cl.² .................. H04N 5/44; H04N 5/76
[58] Field of Search ...... 178/7.3 R, 7.5 R, DIG. 13; 358/4

[56] References Cited

UNITED STATES PATENTS

| | | | |
|---|---|---|---|
| 2,135,577 | 11/1938 | Herbst | 178/DIG. 13 |
| 3,484,545 | 12/1969 | Sugihara | 358/4 X |
| 3,745,241 | 7/1973 | Hirashima | 178/5.8 R |
| 3,795,762 | 3/1974 | Willis | 358/4 X |
| 3,908,083 | 9/1975 | Hiraki et al. | 178/7.5 R |

Primary Examiner—Benedict V. Safourek
Assistant Examiner—Mitchell Saffian
Attorney, Agent, or Firm—Lewis H. Eslinger; Alvin Sinderbrand

[57] ABSTRACT

A combination of a television receiver and a television signal recording and/or reproducing apparatus, such as a so-called video tape recorder, forming a television system for receiving, recording and/or reproducing television signals and displaying images thereof, wherein the television receiver portion contains two separate signal selecting and receiving circuitries each including a separately tunable tuner, an intermediate frequency stage and a detector stage, and specific television signals received by the respective circuitries are selectively applied by selecting switches in the television receiver portion to the display stage of the portion of the television receiver for display of images or to the portion of the signal recording and/or reproducing apparatus for recording.

2 Claims, 2 Drawing Figures

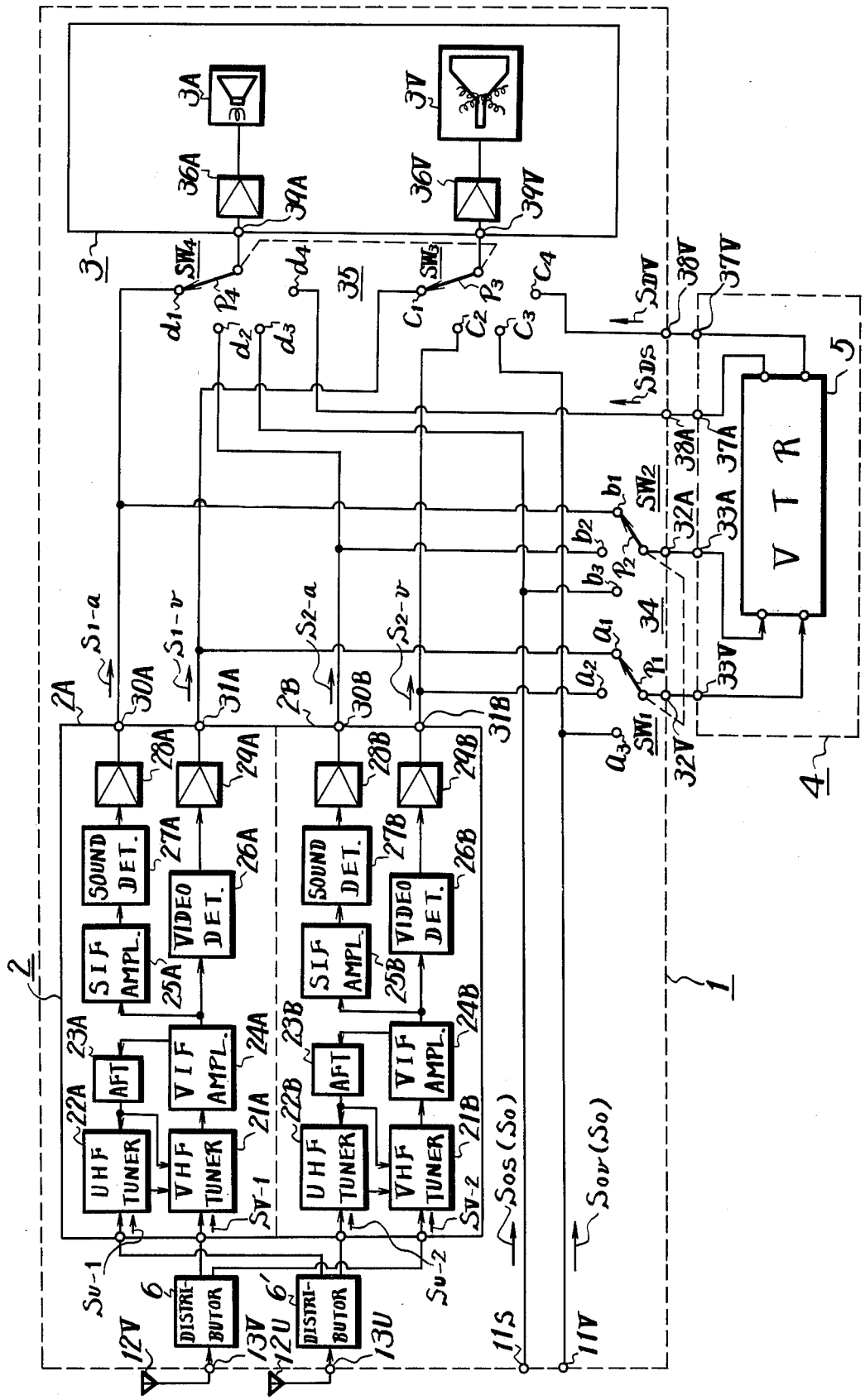

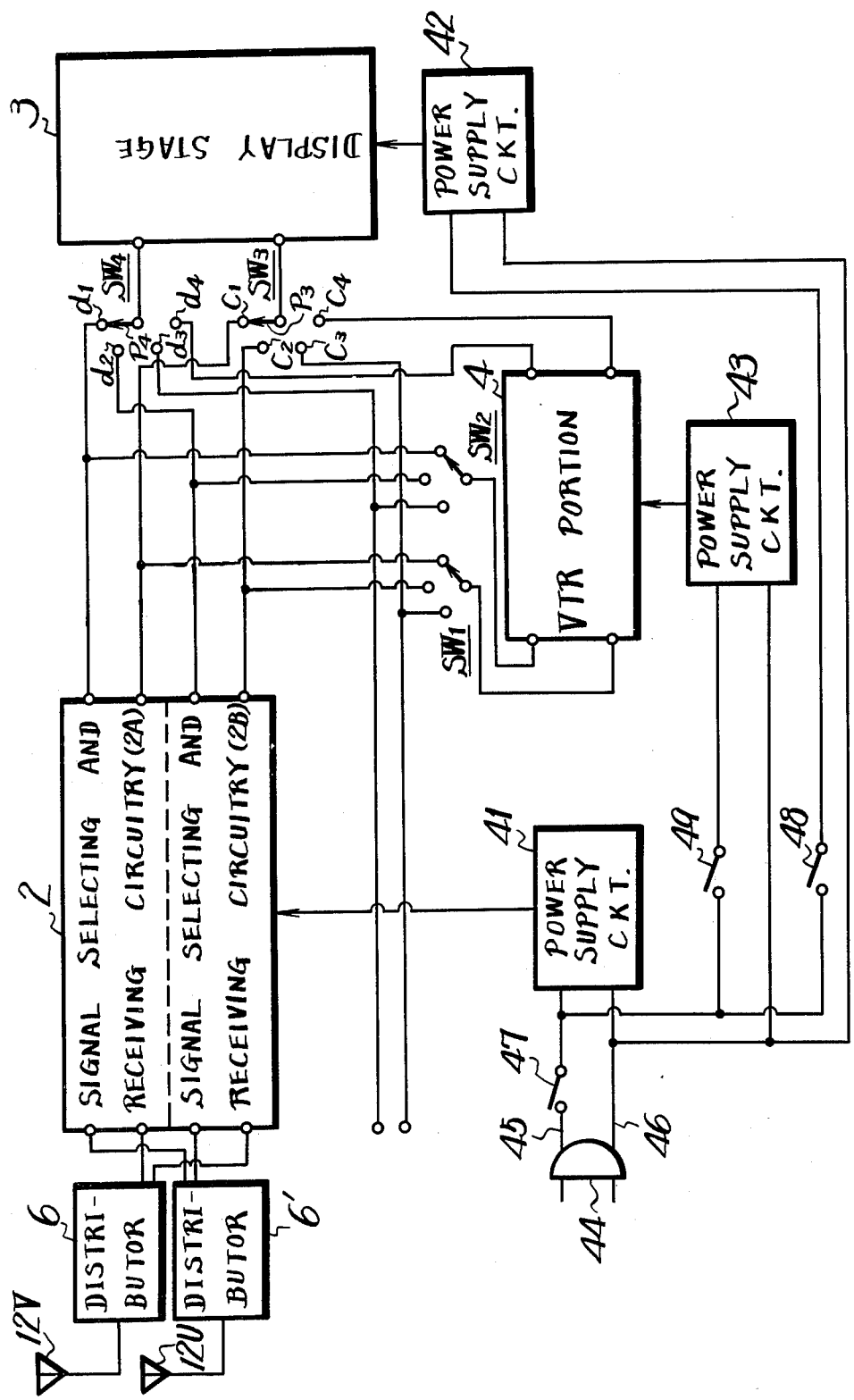

PLURAL RECEIVING AND RECORDING TELEVISION SYSTEM

BACKGROUND OF THE INVENTION

1. Field of the Invention

This inventin relates generally to television apparatus for receiving, recording and/or reproducing a television signal to display the same, and more particularly to television systems comprising the combination of a television receiver and a recording and/or reproducing device, such as a video tape recorder, for the television signal.

2. Description of the Prior Art

Under popularization of apparatus such as a video tape recorder (VTR) for recording and/or reproducing television signals, a television system in the form of the combination of a television receiver and the VTR has been proposed. In such a system, a certain selected program of the television signal is received and displayed by the television receiver portion or is recorded and later reproduced for display by the VTR portion. Generally, for the convenience of users, it is desired for the system to be able to receive a specific program for display and simultaneously to receive another specific program for recording. In conventional systems, in order to achieve this result, signal selecting and receiving circuitry, which includes, for example, a tuner, a video and sound intermediate frequency stage and a video and sound detecting stage, is provided in the television receiver portion of the combined system as usual, and an additional signal selecting and receiving circuitry of the same type as that in the television receiver portion is separately provided in the VTR portion. The television signal received by an antenna and applied to the television receiver portion is also applied to the additional signal selecting and receiving circuitry through a signal distributor attached to the input of the television receiver portion. The display stage of the television receiver portion can be selectively supplied with the output of the signal selecting and receiving circuitry provided therein or with the output signal of the VTR, which is a reproduced television signal.

In the above mentioned conventional systems, since both the television receiver portion and the VTR portion have separate signal selecting and receiving circuitries, the connections between both portions and the signal selection at the respective tuners may prove troublesome to users. Further, a relative long transmission line is required to transmit the television signal received by the external antenna to the selecting and receiving circuitry in the VTR portion from the signal distributor. Such a long transmission line can easily pick up various undesirable radio frequency noise signals that interfere with the television signal.

OBJECTS AND SUMMARY OF THE INVENTION

In the television system of the present invention, the above mentioned disadvantages inherent in the prior art are avoided.

An object of the present invention is to provide an improved television system that can be easily operated for receiving, recording and/or displaying television signals.

Another object of the present invention is to provide a television system for receiving, recording and/or displaying television signals including an improved television receiver which facilitates handling the signals.

Further, another object of the present invention is to provide an improved television receiver suitable for use in combination with apparatus for recording and/or reproducing television signals.

The television system according to the present invention comprises the combination of an improved television receiver with apparatus, such as a VTR, for recording and/or reproducing television signals. The receiver and the recording and/or reproducing apparatus are electrically connected to each other with minimum connecting lines. The improved television receiver has at least two signal selecting and receiving circuitries, each of which includes a separately turnable tuner, an intermediate frequency stage and a detecting stage, for example, and therefore the selection of the television signals to be displayed or recorded is easily carried out entirely within the television receivers.

Other objects, features and advantages of the invention will become apparent from the following description taken in conjunction with the accompanying drawings.

BRIEF DESCRIPTION OF THE DRAWINGS

FIG. 1 is a block diagram showing an embodiment of a television system according to the present invention; and FIG. 2 is a schematic block diagram showing an example of a power supply arrangement for each portion of the embodiment shown in FIG. 1.

DESCRIPTION OF THE PREFERRED EMBODIMENT

FIG. 1 shows an embodiment of the television system according to the present invention in which a VTR is employed as apparatus for recording and/or reproducing a television signal.

The television system of the invention, which is the combination of the television receiver with the VTR, will be hereinafter described with reference to FIG. 1. The two portions of the combination are a television receiver 1 and a VTR 4. The television receiver portion 1 has means for receiving a television signal and demodulating the same and includes, for this purpose, the signal selecting and reciving circuitry 2. The receiver portion 1 also includes a sound signal amplifying system, a speaker 3A and a system for amplifying a demodulated video signal and displaying the same on a cathode ray tube (CRT) 3V as a picture, all of which are included in a display stage 3 also. The display stage 3 also includes a deflection circuit, a high voltage generating circuit, a snychronizing circuit and other known circuits (not shown) for operating the CRT.

The VTR portion 4 has a VTR 5, proper, which comprises a mechanical system including a magnetic head and the like and the electric circuitry for recording and/or reproducing a signal supplied thereto, to the essential function of the VTR.

The signal selecting and receiving circuitry 2 is divided into two equivalent signal selecting and receiving circuitries 2A and 2B. These circuitries receive signals from an antenna 12V for the VHF band and an antenna 12U for the UHF band, respectively. Television signals caught by the VHF and UHF antennae 12V and 12U are supplied to input terminals 13V and 13U and then supplied to signal distributors 6 and 6', respectively, where they are divided into television signals $S_{V\text{-}1}$, $S_{V\text{-}2}$ in the VHF broadcasting band and into television signals $S_{U\text{-}1}$, $S_{U\text{-}2}$ in the UHF broadcasting band. The divided television signals from the distributors are supplied to the two signal selecting and receiving circuitries 2A and 2B, respectively.

Among these televisions signals, the signals $S_{V-1}$ and $S_{V-2}$, as well as the signals $S_{U-1}$ and $S_{U-2}$ are basically the same except for their respective channel frequencies but, for the sake of explanation, the signals supplied to the circuitry 2A are marked with $S_{V-1}$, $S_{U-1}$ and those supplied to the other circuitry 2B are marked with $S_{V-2}$, $S_{U-2}$, respectively.

Since the signal selecting and receiving circuitries 2A and 2B have similar circuit constructions, which are well known, the names of their construction elements are described but their detailed description will be omitted. That is, the circuitries 2A and 2B include VHF tuners; 22A and 22B UHF turners; 22A and 22B automatic fine tuning (AFT) circuits; amplifiers 23A and 23B, 24A and 24B for a video intermediate frequency (VIF); amplifiers 25A and 25B for sound intermediate frequency (SIF); video detector circuits; 26A and 26B, sound detector circuits 27A and 27B and amplifiers 28A, 28B, 29A and 29B, respectively. At output terminals 30A, 30B, 31A, and 31B of the circuitries 2A and 2B are obtained detected sound and video signals $S_{1-a}, S_{2-a}$ and $S_{1-v}, S_{2-v}$, respectively.

These detected output signals are fed to a first switch group 34. In the illustrated example, the first switch group consist of two switches $SW_1$ and $SW_2$. The detected video signals $S_{1-v}$ and $S_{2-v}$ are fed to the switch $SW_1$, while the detected sound signals $S_{1-a}$ and $S_{2-a}$ are fed to the other switch $SW_2$, respectively. The switches $SW_1$ and $SW_2$ are single-pole three-position switches and are ganged with each other. In the illustrated example, the signals $S_{1-v}$ and $S_{2-v}$ are supplied to first and second fixed contacts $a_1$ and $a_2$ of the switch $SW_1$, the signals $S_{1-a}$ and $S_{2-a}$ are supplied to first and second fixed contacts $b_1$ and $b_2$ of the switch $SW_2$, and third fixed contacts $a_3$ and $b_3$ of the switches $SW_1$ and $SW_2$ are supplied with external signals $S_O$ from, for example, a television camera and microphone or the like (not shown in FIG. 1). The circuit includes an input terminal 11S to which a sound signal $S_{OS}(S_O)$ is supplied and an input terminal 11V to which a corresponding video signal $S_{OV}(S_O)$ is supplied from the television camera and microphone, respectively.

The switches $SW_1$ and $SW_2$ select the detected output signals and supply them to the VTR 5 as the signal to be recorded therein. To this end, the detected output signals selected by movable arms $P_1$ and $P_2$ of the switches $SW_1$ and $SW_2$, wich are moved in ganged relation, are transmitted through output terminals 32V and 32A of the receiver portion 1 to input terminals 33V and 33A of the VTR portion 4. The signals fed to the input terminals 33V and 33A are directly supplied to the VTR proper 5 as the signals to be recorded therein.

In the receiver portion 1, there are two more ganged switches $SW_3$ and $SW_4$ which form a second switch 35 to make it possible for either pair of the detected output signals or the reproduced signal from the VTR portion 4 to be selected thereby and then fed to the display stage 3. One of the second switch group 35, the switch $SW_3$ in the illustrated example, is a single-pole four-position switch whose first to third fixed contacts $c_1$ to $c_3$ are supplied with the detected output video signals $S_{1-v}, S_{2-v}$ and the video signal $S_{OV}$ and whose fourth fixed contact $c_4$ is supplied with a video detected output signal $S_{DV}$ in the reproduced output from the VTR portion 4. The detected output selected by a movable arm $P_3$ of the switch $SW_3$ is supplied through an amplifier circuit 36V to the video signal reproducing portion 3V including the CRT.

The other switch $SW_4$, which is in ganged relation to the switch $SW_3$, serves to select one of the sound detect output signals. That is, the first to fourth fixed contacts $d_1$ to $d_4$ of the switch $SW_4$ are supplied, respectively, with the sound detected signals $S_{1-a}, S_{2-a}$, the sound output signal $S_{OS}$ and a sound detected output signal $S_{DS}$ in the reproduced output from the VTR portion 4 corresponding to the video signals applied to the switch $SW_3$. The signal selected by a movable arm $P_4$ of the switch $SW_4$ is fed through an amplfier circuit 36A to the sound reproducing portion 3A including the speaker.

In FIG. 1, the output terminals of the VTR portion 4 are terminals 37A and 37V, the reproduced signal input terminals of the television receiver portion 1 are the terminals 38A and 39V, and the input terminals of the display stage 3 are the terminals 39 and 39V.

If the television system is constructed as above, the selection of signals can be achieved by the television receiver portion 1 regardless of the operating states of the television receiver portion 1 and VTR portion 4, which will be described now. Since the two signal selecting and receiving circuitries 2A, 2B and the first and second switch groups 34 and 35 are all accommodated in the television receiver portion 1, the station selection operation and signal selection operation for displaying a picture and recording the signal by the VTR 5 can be carried out by the receiver portion 1, alone. Further, as to the selection of the broadcasting television signal, the external signal from the camera or the like and the reproduced ouput signal from the VTR, several selection modes are possible. Therefore, the television system according to the present invention can be used more flexibly than the prior art system.

1. Either the television signals in the VHF or the UHF bands and external signal is selected by the first switch group 34, and the selected signal is fed to the VTR 5 to be recorded therein. The signal recorder on the VTR 5 can be displayed on the display stage 3 at the same time.

2. Since two signal selecting and receiving circuitries 2A and 2B are provided in the television receiver portion 1, any signal from the signal selecting and receiving circuitries 2A and 2B can be displayed on the display stage 3 by properly setting the movable arms $P_3$ and $P_4$ of the switches $SW_3$ and $SW_4$ without having the signal pass through the VTR portion 4. Therefore, a picture of good quality always be reproduced. In the prior art, one circuitry is provided in a VTR portion. Thus, when the signal received by the VTR portion is to be displayed, it is necessary that this signal pass through the VTR portion. In this case, since the signal passes through the tape system of the VTR, the quality of the reproduced picture may be deteriorated.

In the present invention since the first and second switch groups 34 and 35 are provided in the television receiver portion 1, the signals transmitted and received between the receiver portion 1 and the VTR portion 4 are the input signal (recording signal) to the VTR portion 4 and the reproduced signal therefrom only. Therefore, the number of connection wires or lines therebetween can be reduced and hence the wiring thereof can be simplified.

Further, in accordance with the invention, the signal transmission and reception connection between the receiver portion 1 and the VTR 4 do not handle an RF signal, so that no jamming signal is picked up during the signal transmission and reception, and hence the quality of a reproduced picture is not deteriorated, which can not be achieved by the prior art system. In the illustrated example of the invention, only four connecting wires are necessary.

As described above, in the present invention the novel television receiver has therein two signal selecting and receiving circuitries 2A and 2B and first and second switch switch groups 34 and 35, and the television system combines the novel television receiver with the VTR, so that the advantage in treatment of the signal and the advantage of simplifying the signal selection can be obtained.

In the embodiment of the invention shown in FIG. 1, the first and second switch groups 34 and 35 are provided in the television receiver portion 1, but they may be provided in the VTR portion 4, which is, of course within the scope of the invention.

FIG. 2 is a schematic block diagram showing an example of power supply arrangement for the signal selecting and receiving circuitry 2, the display stage 3 and the VTR portion 4 of the television system shown in FIG. 1, wherein the same reference numerals are used to designate the corresponding elements of FIG. 1 and the detailed description thereof will be omitted for the sake of brevity.

As shown in FIG. 2, power supply circuits are provided for supplying power voltages to the signal selecting and receiving circuitry 2, the display stage 3 and the VTR portion 4 independently. That is, power supply circuits 41, 42 and 43 are provided for the signal selecting and receiving circuitry 2, display stage 3 and VTR portion 4, respectively. In this case, one of power supply lines 45 and 46 connected to a power source plug 44 or the power line 45 is connected through a master power switch 47 to the power supply curcuit 41 for the signal selecting and receiving circuitry 2 and also through power switches 48 and 49 to the power supply circuits 42 and 43 for the display stage 3 and the VTR portion 4, respectively. The other power supply line 46 is connected to the respective power supply circuits 41, 42 and 43.

When only the received signal is reproduced by the television system of the invention shown in FIG. 2, the master power source switch 47 and the power switch 48 for the display stage 3 are closed or made ON to supply the power to the signal selecting and receiving circuit 2 and the display stage 3 from the power supply circuits 41 and 42, respectively. The movable arm $P_3$ of the switch $SW_3$ is changed to contact with its second contact $c_2$ from its first fixed arm $c_1$, and the movable contact $P_4$ of the switch $SW_4$ is switched to contact with its second fixed contact $d_2$ from its first contact $d_1$, respectively. Thus, the signals from the signal selecting and receiving circuitry 2B are supplied to the display stage 3 and the received signals are reproduced on the CRT of the display stage 3 as a picture. At this time, the VTR portion 4 is supplied with no power, so that useless power consumption is avoided.

When the received signals are recorded only, the master power source switch 47 and the switch 49 for the VTR portion 4 are closed or made ON to supply the power to the signal selecting and receiving circuitry 2 and the VTR portion 4 from the power supply circuits 41 and 43 to place the VTR portion 4 in a recording state. Thus, the signals from the signal selecting and receiving circuitry 2 are supplied to the VTR portion 4 and then recorded on the tape thereof. In this case, if a timer, for example, is provided to make the switches 47 and 49 ON at a predetermined time, a desired program can be recorded in the VTR portion 4 when the user leaves his home. At this time, since the display stage 3 is supplied with no power, useless power is not consumed.

When the received signal is recorded and also monitored, the respective power switches 47, 48 and 49 are closed to supply the power to all the signal selecting and receiving circuitry 2, VTR portion 4 and display stage 3 and the movable arms $P_3$ and $P_4$ of the switches $SW_3$ and $SW_4$ are changed to contact with their fourth contacts $c_4$ and $d_4$, respectively. Thus, the signal from the circuitry 2 is supplied to the VTR portion 4 to be recorded on its tape and the signal recorded on the tape of the VTR 4 is supplied to the display stage 3 to be reproduced as a picture on the CRT thereof.

When the recorded signal on the tape of the VTR portion 4 is displayed on the display stage 3, it is enough that the respective power switches 47, 48 and 49 are closed and the movable contacts $P_3$ and $P_4$ of the switches $SW_3$ and $SW_4$ are changed to contact with their fourth fixed contacts $c_4$ and $d_4$. In this case, the signal selecting and receiving circuitry 2 is also supplied with the power from the power supply circuit 41 in the illustrated example, but it may be possible that the signal selecting and receiving circuitry 2 is not supplied with power if another switch is provided between the master power switch 47 and the power supply circuit 41 for the signal selecting and receiving circuitry 2.

As may be apparent from the above description, with the power supply circuits shown in FIG. 2, the display stage 3 and the VTR portion 4 can be supplied with the power separately, so that when the received signal is monitored only or recorded only, useless power consumption can be avoided.

The above description is given only one preferred embodiment of the invention, but it may be apparent that many modifications and variations could be effected by one skilled in the art without departing from the scope of the novel concepts of the present invention, so that the scope of the invention should be determined by the claims only.

We claim as our invention:
1. A television system comprising the combination of:
   A. signal recording and/or reproducing apparatus having input and output terinals; and
   B. a television receiver comprising:
     1. a pair of signal selecting and receiving circuitries, each including at least a separately tunable tuner, a video intermediate frequency amplifier, a video detector, and a sound detector,
     2. a display stage including sound and video reproducing circuits,
     3. first switching means for selectively connecting one of said pair of signal selecting and receiving circuitries to the input terminal of said recording and/or reproducing apparatus, and
     4. second switching means for selectively connecting one of said pair of signal selecting and receiving circuitries and the output terminal of said recording and/or reproducing apparatus to said display stage.

2. A television system according to claim 1 comprising power supply means and first, second, and third power switches, said pair of signal selecting and receiving circuitries being connected to said power supply means by said first power switch, said display stage being connected to said power supply means by said second power switch, and said signal recording and/or reproducing apparatus being connected to said power supply means by said third power switch wherein said first, second and third power switches are operable independently of one another.

* * * * *